(12) United States Patent
Li et al.

(10) Patent No.: US 11,573,175 B2
(45) Date of Patent: Feb. 7, 2023

(54) CALIBRATION ASSEMBLY FOR SCAN DEVICE AND CALIBRATION SYSTEM

(71) Applicant: INDUSTRIAL TECHNOLOGY RESEARCH INSTITUTE, Hsinchu (TW)

(72) Inventors: Yu-Tai Li, Taichung (TW); Wei-Yu Lin, Zhubei (TW); Chia-Jen Lin, New Taipei (TW); Chin Lien, Taipei (TW); Cho-Fan Hsieh, Yilan County (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 82 days.

(21) Appl. No.: 17/131,515

(22) Filed: Dec. 22, 2020

(65) Prior Publication Data
US 2022/0196549 A1  Jun. 23, 2022

(51) Int. Cl.
*G01N 21/3581* (2014.01)
*G01N 21/59* (2006.01)

(52) U.S. Cl.
CPC ......... *G01N 21/3581* (2013.01); *G01N 21/59* (2013.01); *G01N 2201/127* (2013.01)

(58) Field of Classification Search
None
See application file for complete search history.

(56) References Cited

U.S. PATENT DOCUMENTS

| | | | |
|---|---|---|---|
| 4,625,168 A * | 11/1986 | Meyer | G01R 33/58 324/318 |
| 4,897,347 A | 1/1990 | Katsuyama et al. | |
| 9,733,384 B2 | 8/2017 | Suzuki et al. | |
| 10,197,451 B2 * | 2/2019 | Weatherall | G01K 7/00 |

(Continued)

FOREIGN PATENT DOCUMENTS

| | | |
|---|---|---|
| CN | 104718447 A | 6/2015 |
| CN | 110412655 A | 11/2019 |

(Continued)

OTHER PUBLICATIONS

TW Notice of Allowance in Application No. 110100471 dated May 2, 2022.

*Primary Examiner* — Edwin C Gunberg
(74) *Attorney, Agent, or Firm* — Maschoff Brennan (57) ABSTRACT

The disclosure provides a calibration assembly for a scan device. The calibration assembly includes a plurality of light-permeable plates and a reflection plate. The light-permeable plates are different in size, and the light-permeable plates are arranged along thicknesses directions thereof to form a step shape. The light-permeable plates define a plurality of light-permeable areas that respectively have different numbers of layers of the light-permeable plates inversely proportional to transmittances of the light-permeable areas. The light-permeable areas are configured to be permeable to a light having a predetermined frequency. The reflection plate is disposed at a side of one of the light-permeable plates in the thickness direction thereof. The (Continued)

reflection plate has a plurality of first holes having different sizes, and the reflection plate is configured to block the light having the predetermined frequency. The disclosure also provides a calibration system having the calibration assembly.

18 Claims, 6 Drawing Sheets

(56) References Cited

U.S. PATENT DOCUMENTS

| | | |
|---|---|---|
| 10,463,339 B2 | 11/2019 | Hilton et al. |
| 10,816,486 B2 | 10/2020 | Artemiev et al. |
| 2008/0314114 A1 | 12/2008 | Feke et al. |
| 2014/0014829 A1* | 1/2014 | Barber .................... G01S 7/411 |
| | | 250/252.1 |
| 2019/0302039 A1 | 10/2019 | Artemiev et al. |

FOREIGN PATENT DOCUMENTS

| | | |
|---|---|---|
| CN | 210534345 U | 5/2020 |
| TW | 201945690 A | 12/2019 |
| WO | 2010/016211 A1 | 2/2010 |

* cited by examiner

CALIBRATION ASSEMBLY FOR SCAN DEVICE AND CALIBRATION SYSTEM

TECHNICAL FIELD

The disclosure provides a calibration assembly for a scan device and a calibration system, more particularly to a calibration assembly and a calibration system that can visualize the testing result of the scan device.

BACKGROUND

Terahertz (THz) radiation falls between microwave radiation and infrared radiation in the electromagnetic spectrum, and it oscillates at frequencies of between 100 billion and 30 trillion cycles per second. Terahertz radiation can penetrate some distance through materials such as paper, clothing, wood, and walls, as well as detect air pollution. Thus, terahertz radiation is useful for many particular applications. Also, terahertz radiation is not ionizing radiation so its low photon energies in general do not harm to human, thus the terahertz radiation can be applied to a full-body scanner in airports for security screening purposes.

It is known that the intensity of the terahertz radiation, the resolution of the scanner, and the speed of the objects transported by the conveyor would affect the detection precision. For example, too high or too low intensity of terahertz radiation may lead to an unclear image presented to security staff. In addition, different objects are suitable for different intensities and different resolutions of terahertz radiation. Therefore, it is desired to efficiently and immediately determine whether a terahertz radiation scanner meets requirements.

SUMMARY

One embodiment of the disclosure provides a calibration assembly for a scan device. The calibration assembly includes a plurality of light-permeable plates and a reflection plate. The light-permeable plates are different in size, and the light-permeable plates are arranged along thicknesses directions thereof to form a step shape. The light-permeable plates define a plurality of light-permeable areas that respectively have different numbers of layers of the light-permeable plates inversely proportional to transmittances of the light-permeable areas. The light-permeable areas are configured to be permeable to a light having a predetermined frequency. The reflection plate is disposed at a side of one of the light-permeable plates in the thickness direction thereof. The reflection plate has a plurality of first holes having different sizes, and the reflection plate is configured to block the light having the predetermined frequency.

Another embodiment of the disclosure provides a calibration assembly for a scan device. The calibration assembly includes a light-permeable plate and a reflection plate. The light-permeable plate includes a plurality of step portions made of a single piece. The light-permeable plate defines a plurality of light-permeable areas that respectively have different thicknesses inversely proportional to transmittances of the light-permeable areas. The light-permeable areas are configured to be permeable to a light having predetermined frequency. The reflection plate is disposed at a side of the light-permeable plate in a thickness direction of the light-permeable plate. The reflection plate has a plurality of first holes having different sizes, and the reflection plate is configured to block the light having the predetermined frequency.

Still another embodiment of the disclosure provides a calibration system. The calibration system includes a conveyor, a calibration assembly, at least one light receiver, and a light transmitter. The calibration assembly, located on the conveyor, includes a light-permeable plate and a reflection plate. The light-permeable plate includes a plurality of step portions made of a single piece. The light-permeable plate defines a plurality of light-permeable areas that respectively have different thicknesses inversely proportional to transmittances of the light-permeable areas. The light-permeable areas are configured to be permeable to a light having predetermined frequency. The reflection plate is disposed at a side of the light-permeable plate in a thickness direction of the light-permeable plate. The reflection plate has a plurality of first holes having different sizes, and the reflection plate is configured to block the light having the predetermined frequency. The light receiver is located at a side of the conveyor. The light transmitter is located at another side of the conveyor. The light transmitter is configured to transmit light to the calibration assembly, and the light receiver is configured to receive the light from the calibration assembly.

Still yet another embodiment of the disclosure provides a calibration system. The calibration system includes a conveyor, a calibration assembly, at least one light receiver, and a light transmitter. The calibration assembly, located on the conveyor, includes a plurality of light-permeable plates and a reflection plate. The light-permeable plates have different sizes, and the light-permeable plates are arranged along thickness directions thereof to form a step shape. The light-permeable plates define a plurality of light-permeable areas that respectively have different numbers of layers of the light-permeable plates inversely proportional to transmittances of the light-permeable areas. The light-permeable areas are configured to be permeable to a light having a predetermined frequency. The reflection plate is disposed at a side of one of the light-permeable plates in the thickness direction thereof. The reflection plate has a plurality of first holes having different sizes, and the reflection plate is configured to block the light having the predetermined frequency. The light receiver is located at a side of the conveyor. The light transmitter is located at another side of the conveyor. The light transmitter is configured to transmit the light to the calibration assembly, and the light receiver is configured to receive the light from the calibration assembly.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained, unless the terms have a specific meaning in the present disclosure.

Figure 1:
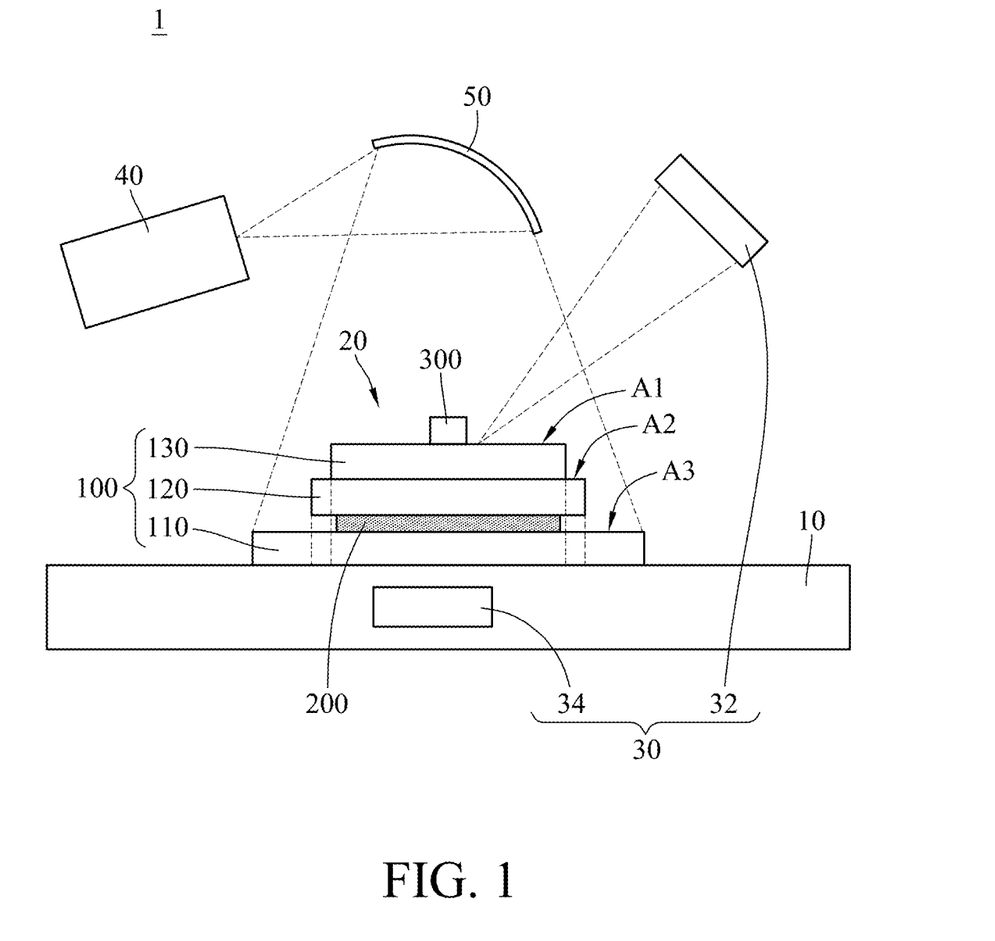
FIG. 1 is a schematic view of a calibration system according to a first embodiment of the disclosure.
Figure 2:
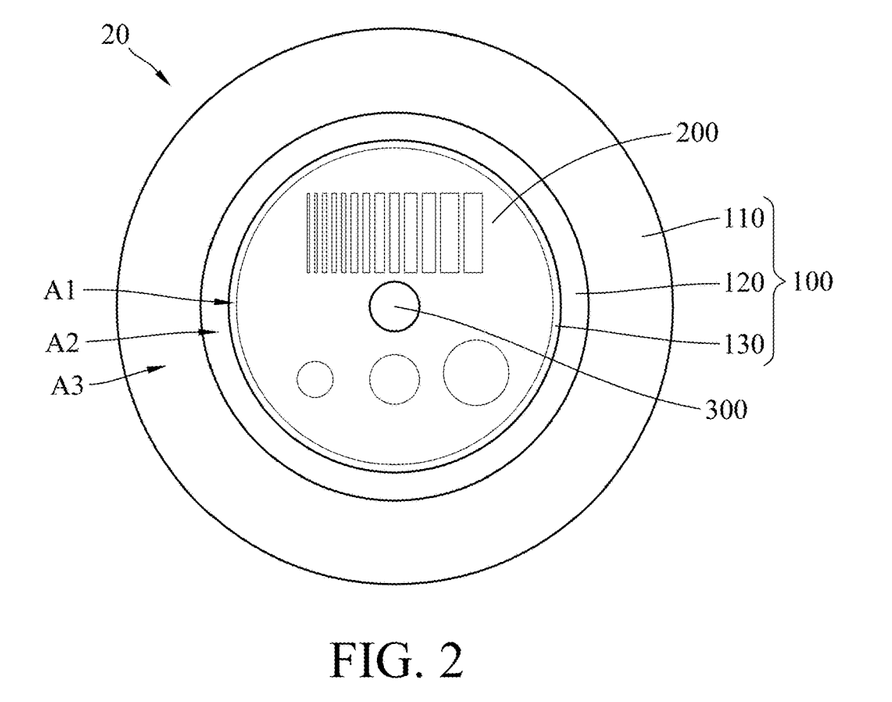
FIG. 2 is a top view of a calibration assembly of the calibration system in FIG. 1.
Figure 3:
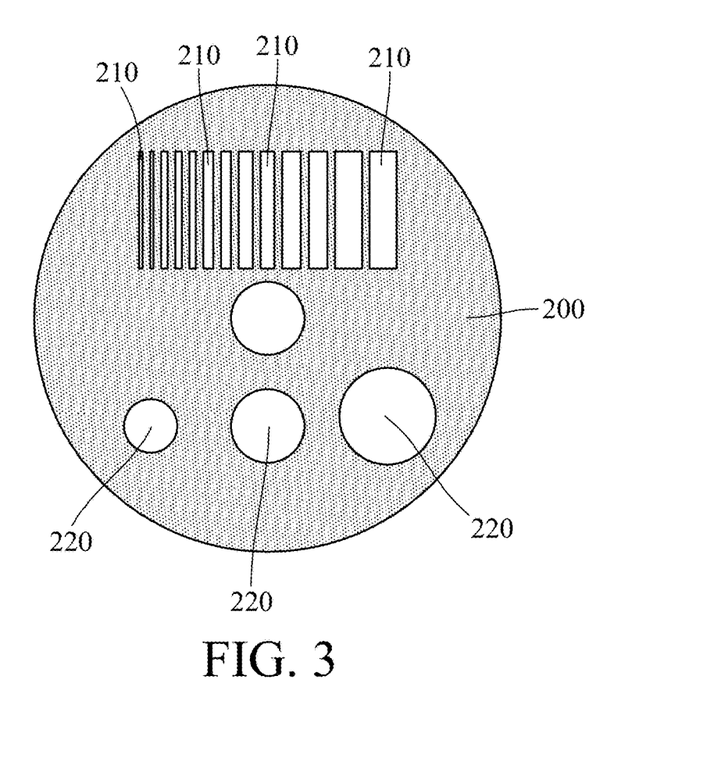
FIG. 3 is a top view of a reflection plate of the calibration assembly in FIG. 2.

Referring to FIGS. 1 to 3, there are shown a schematic view of a calibration system 1 according to a first embodiment of the disclosure, a top view of a calibration assembly 20 of the calibration system 1 in FIG. 1, and a top view of a reflection plate 200 of the calibration assembly 20 in FIG. 2.

In this embodiment, the calibration system 1 includes a conveyor 10, the calibration assembly 20, a plurality of light receivers 30 and a light transmitter 40. The conveyor 10 can be driven by electricity and has a belt (not numbered) to transport objects needed to be scanned. The calibration assembly 20 is located on the belt of the conveyor 10 and can be moved with the belt. The light receivers 30 includes a reflection light receiver 32 and a penetration light receiver 34. The reflection light receiver 32 is located on a reflection path of light reflected by the calibration assembly 20, and the penetration light receiver 34 is located on a travel path of light penetrating through the calibration assembly 20. The light transmitter 40 is located at a side of the conveyor 10. The light transmitter 40 is configured to transmit a light beam having a predetermined frequency to the calibration assembly 20, and one of the light receivers 30 is configured to receive the light beam from the calibration assembly 20. In this embodiment, the calibration system 1 can produce a light beam with a frequency of between 0.1 and 10 THz so as to be able to calibrate a terahertz radiation scanner, but the present disclosure is not limited thereto.

In this embodiment, the calibration system 1 may further include a reflection mirror 50. The reflection mirror 50 is configured to reflect the light beam transmitted by the light transmitter 40 to the calibration assembly 20, thereby facilitating the size reduction of the calibration system 1.

In this embodiment, the calibration assembly 20 further includes a plurality of light-permeable plates 100 and a reflection plate 200.

The light-permeable plates 100 are in different sizes and are stacked to form a lamination of trapezoid-like shape or having a step shape. In specific, the light-permeable plates 100 includes a first light-permeable plate 110, a second light-permeable plate 120, and a third light-permeable plate 130. The second light-permeable plate 120 has a smaller width than that of the first light-permeable plate 110 and is stacked on or above the first light-permeable plate 110. The third light-permeable plate 130 has a smaller width than that of the second light-permeable plate 120 and is stacked on the second light-permeable plate 120. In this arrangement, the third light-permeable plate 130 is unable to fully cover the upper surface of the second light-permeable plate 120, and the second light-permeable plate 120 is unable to fully cover the upper surface of the first light-permeable plate 110. As shown, the light-permeable plates 100 has light-permeable areas A1, A2, and A3, where the light-permeable area A1 is defined by the overlapping parts of all of the light-permeable plates 100 along their stacking direction, the light-permeable area A2 is defined by the overlapping parts of the second light-permeable plate 120 and the first light-permeable plate 110 except for the light-permeable area A1, and the light-permeable area A3 is defined by the part of the first light-permeable plate 110 not overlapping with others light-permeable plates 100. The light-permeable areas A1, A2, and A3 are configured for the penetration of the light beam having the predetermined frequency.

As such, the light-permeable area A1 contains at least three layers of the light-permeable plates 100, the light-permeable area A2 contains two layers of the light-permeable plates 100 (i.e., the second light-permeable plate 120 and the first light-permeable plate 110), and the light-permeable area A3 only contains one layer of the light-permeable plates 100 (i.e., the first light-permeable plate 110), thus the light-permeable area A1 has the lowest transmittance to light, the light-permeable area A3 has the highest transmittance to light, and the light-permeable area A2 has a transmittance between that of the light-permeable areas Al and A3. In other words, the light-permeable areas A1, A2, and A3 are different in light transmittance, and their transmittances are inversely proportional to the number of overlapping layers. The light-permeable areas A1, A2, and A3 are configured for evaluating the intensity of the light beam.

Note that the number of the light-permeable plates 100 is exemplary and not intended to limit the disclosure; in some other embodiments, the calibration assembly may have less or more number of light-permeable plates.

In this embodiment, the light-permeable plates are in a circular shape, but the disclosure is not limited thereto; in some other embodiments, the light-permeable plates may be in another shape, such as triangular shape, rectangular shape or diamond shape.

In this embodiment, the light-permeable plates 100 are coaxially stacked on one another, but the present disclosure is not limited thereto; in some other embodiments, the light-permeable plates 100 may non-coaxially stacked on one another.

In this embodiment, the light-permeable plates 100 have the same thickness, but the present disclosure is not limited thereto; in some other embodiments, the light-permeable plates may have different thicknesses.

In this embodiment, the light-permeable plates 100 are made of a non-metallic material, such as plastic, paper, wood and so on.

The reflection plate 200 is made of metal, such as aluminum, iron, stainless steel, or other suitable material. The reflection plate 200 is disposed on a side of one of the light-permeable plates 100. In this embodiment, the reflection plate 200 is, for example, located between the first light-permeable plate 110 and the second light-permeable plate 120. The reflection plate 200 has a plurality of first holes 210. The first holes 210 are, for example, elongated through holes of different widths. The solid portion of the reflection plate 200 can block the light beam, and the first holes 210 of the reflection plate 200 are the passages for allowing the light beam to pass through the reflection plate 200.

In this embodiment, the reflection plate 200 further has a plurality of second holes 220. The second holes 220 are circular through holes of different diameters. The first holes 210 and the second holes 220 are configured for detecting the resolution. Note that the second holes 220 of the reflection plate 200 are optional; in some other embodiments, the reflection plate may not have any circular shaped through holes.

In this embodiment, the reflection plate 200 is in contact with two of the light-permeable plates 100, but the present disclosure is not limited thereto; in some other embodiments, the reflection plate 200 may be spaced apart from the light-permeable plates 100.

In this embodiment, the reflection plate 200 has a smaller width than that of the third light-permeable plate 130, such that the reflection plate 200 can be prevented from fully blocking the light beam entering into the light-permeable area A1. In other words, the arrangement of the smaller width of the reflection plate 200 than that of the third light-permeable plate 130 can remain a part of the light-permeable area A1 for the penetration of the light beam.

In this embodiment, the calibration assembly 20 may further include a pole 300.

The light-permeable plates 100 and the reflection plate 200 are circular plates. The pole 300 is disposed through the centers of the light-permeable plates 100 and the reflection plate 200, such that the light-permeable plates 100 and the reflection plate 200 are in a coaxial arrangement.

Then, referring to FIGS. 4 to 8, there are shown images (also called 'testing images') that are produced by the light beam projecting on the calibration assembly 20 and can be used to calibrate a scan device.

Figure 4:
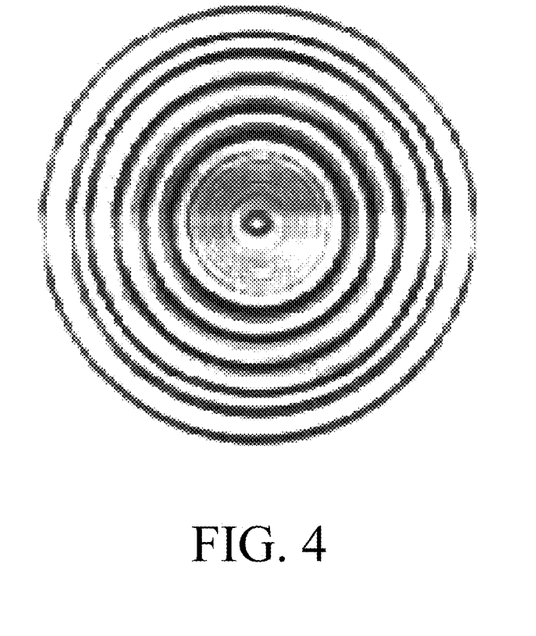
FIGS. 4 to 8 show images produced by a light beam projecting on the calibration assembly in FIG. 1.
Figure 5:
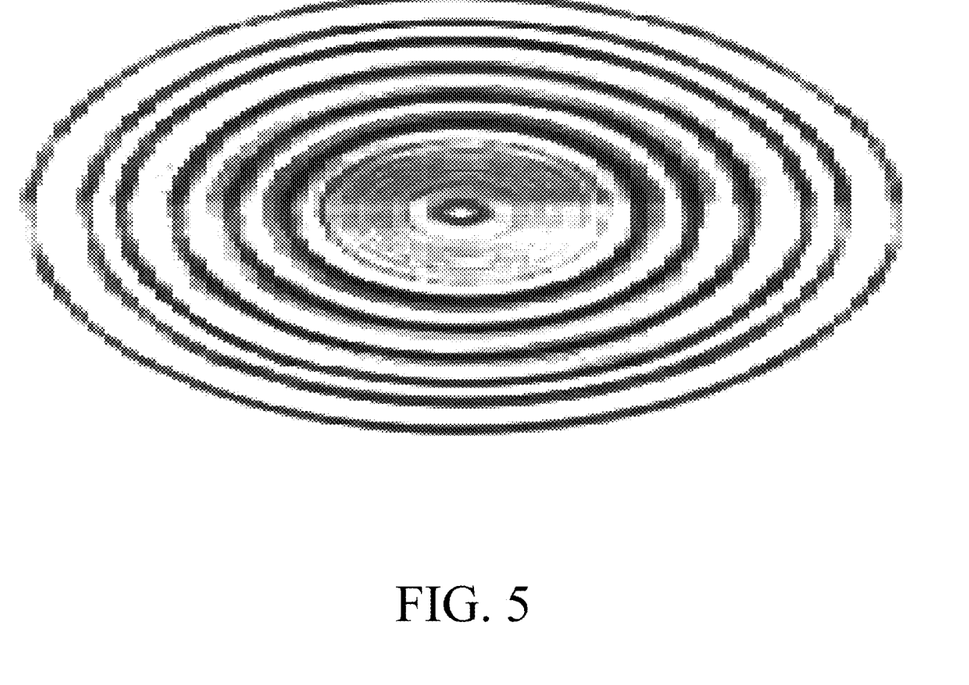

Firstly, a roundness test is performed. When the image scanning speed of the detector (i.e. imaging speed) is set or adjusted substantially equal to the moving speed of conveyor 10, the testing image is determined to be circular, as shown in FIG. 4. When the moving speed of the conveyor 10 is lower than the image scanning speed of the detector, the testing image is determined to be elliptical, as shown in FIG. 5. In the latter case, the conveyor 10 is required to be adjusted to match the image scanning speed of the detector.

Figure 6:
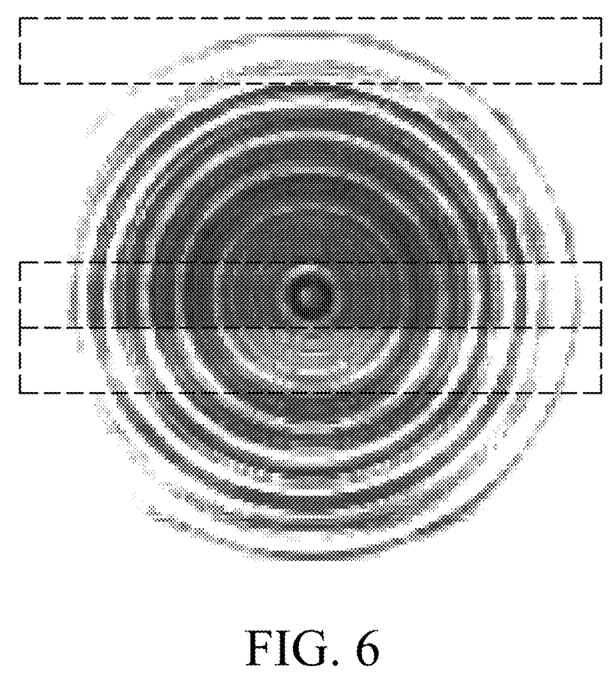
Figure 7:
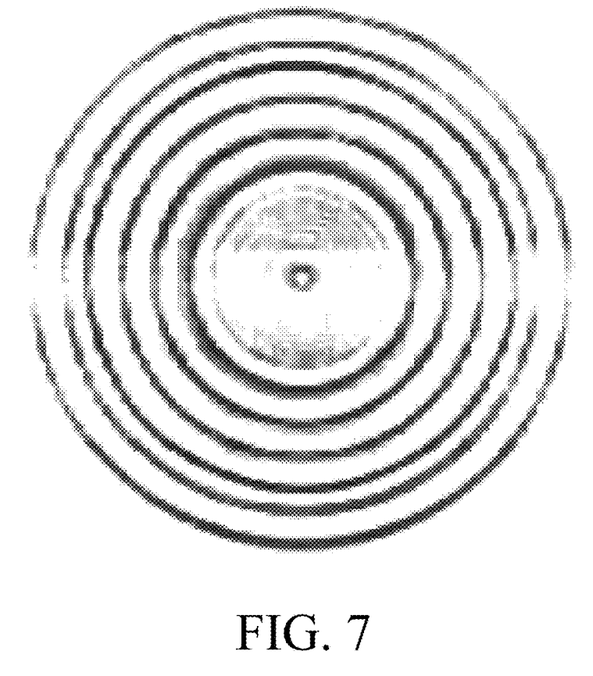

Then, a luminous intensity test is performed. When the light emitted by the light transmitter 40 meets the luminous intensity value required for the calibration, the gradient of the image from the center to the edge of the image is obvious. As shown in FIG. 6, the darkness of the image decreased from the center to the edge thereof. On the other hand, as shown in FIG. 7, when the light emitted by the light transmitter 40 has the luminous intensity stronger than luminous intensity value required for the calibration, the gradient of the image from the center to the edge of the image is unobvious, and the overall testing image is bright.

In addition, the areas in dotted lines shown in FIG. 6 have higher contrast or more discontinuous than other places, thus these areas may be considered to be low uniformity and require calibration.

Figure 8:
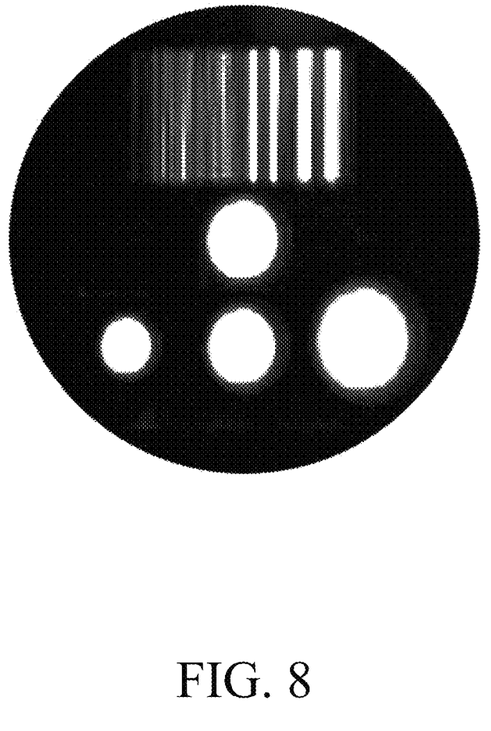

Then is to determine the resolution of the penetration light receiver 34. Whether the resolution of the penetration light receiver 34 meets the requirement can be determined according to the portions of the testing image corresponding to the first holes 210. As shown in FIG. 8, the light beam will diffract when passing through the first holes 210 and then will form a diffraction pattern of light at the penetration light receiver 34. When the diffraction patterns of light overlap with each other to make it unable to determine the widths of the first holes 210 and the distances between adjacent first holes 210, the penetration light receiver 34 is determined to be low in resolution; that is, the penetration light receiver 34 may have insufficient pixels (e.g., the small number of the pixel per unit area) to resolute the distance between two first holes 210. In addition, as shown in FIG. 8, due to the distraction of the light, the left portion of testing image corresponding to parts of first holes 210 having smaller width is blurry, such that the resolution of the penetration light receiver 34 can be determined via the relatively clear left portion of the testing image.

Note that the numbers, thicknesses, and diameters of the light-permeable plates 100 and the reflection plate 200 in one calibration assembly 20 can be modified according to actual requirements. In some other embodiments, the calibration assembly 20 may be integrally made of a single piece for improving the image quality. In specific, referring to FIGS. 9 and 10, there are shown a schematic view of a calibration assembly according to a second embodiment of the disclosure and a top view of the calibration assembly in FIG. 9.

Figure 9:
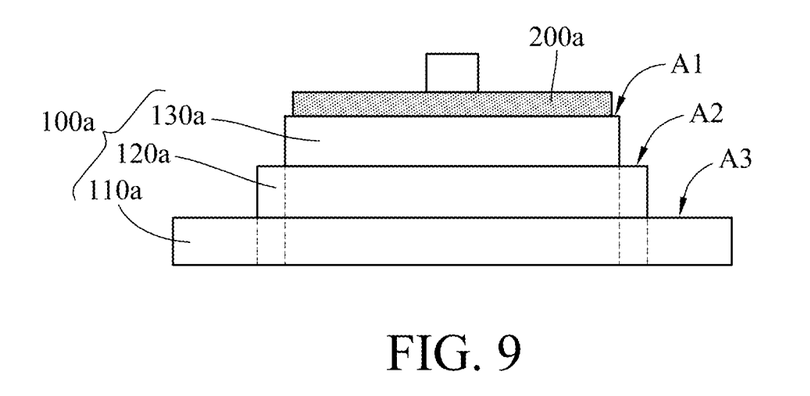
FIG. 9 is a schematic view of a calibration assembly according to a second embodiment of the disclosure.
Figure 10:
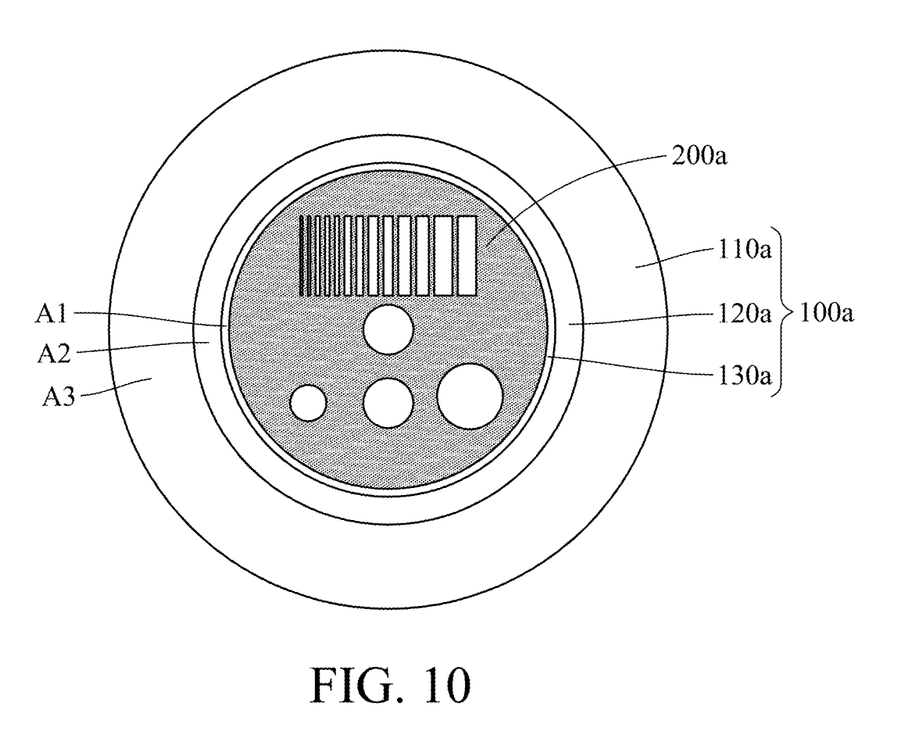
FIG. 10 is a top view of the calibration assembly in FIG. 9.

In this embodiment, the calibration assembly includes a light-permeable plate 100a and a reflection plate 200a. The light-permeable plate 100a includes a plurality of step portions 110a, 120a, and 130a. The step portions 110a, 120a, and 130a are integrally made of a single piece. The light-permeable plate 100a defines a plurality of light-permeable areas A1, A2, and A3. The light-permeable areas A1, A2, and A3 have different thicknesses inversely proportional to transmittances of the light-permeable areas A1, A2, and A3. The light-permeable areas A1, A2, and A3 are configured to be permeable to a light beam having predetermined frequency.

In detail, the step portions 110a, 120a, and 130a includes a first step portion 110a, a second step portion 120a, and a third step portion 130a. The second step portion 120a has a size smaller than that of the first step portion 110a and is connected to and located above the first step portion 110a. The third step portion 130a has a size smaller than that of the second step portion 120a and is connected to and located above the second step portion 120a. The reflection plate 200a has a size smaller than that of the third step portion 130a.

The reflection plate 200a is disposed on a side of the light-permeable plate 100a in the thickness direction of the light-permeable plate 100a. The reflection plate 200a are similar to the reflection plate 200 of the previous embodiment, thus it will not be repeatedly introduced hereinafter.

According to the calibration assemblies and the calibration systems as discussed above, the light-permeable plates of the different sizes and the reflection plate having holes of the different sizes allow the luminous intensity of the light transmitter, the resolution of the light receiver, and the speed of the conveyor to be determined in one step from the testing images generated from the light beam projecting on the calibration assembly, thereby improving the calibration efficiency of the scan device. In addition, the calibration assembly can replace the expensive photometer, thereby saving the cost to the calibration of the scan device.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A calibration assembly for a scan device, comprising:
a plurality of light-permeable plates, wherein the plurality of light-permeable plates are different in size, the plurality of light-permeable plates are arranged along thicknesses directions thereof to form a step shape, the plurality of light-permeable plates define a plurality of light-permeable areas that respectively have different numbers of layers of the light-permeable plates inversely proportional to transmittances of the plurality of light-permeable areas, and the plurality of light-permeable areas are configured to be permeable to a light having a predetermined frequency; and a reflection plate, disposed at a side of one of the plurality of light-permeable plates in the thickness direction thereof, wherein the reflection plate has a plurality of first holes having different sizes, and the reflection plate is configured to block the light having the predetermined frequency.

2. The calibration assembly according to claim 1, wherein adjacent two of the plurality of light-permeable plates and the reflection plate are adjacent and stacked with each other.

3. The calibration assembly according to claim 1, further comprising a pole, wherein the plurality of light-permeable plates and the reflection plate are in a circular shape, the pole is disposed through centers of the plurality of light-permeable plates and the reflection plate, such that the plurality of light-permeable plates and the reflection plate are in a coaxial arrangement.

4. The calibration assembly according to claim 1, wherein the plurality of light-permeable plates are the same in thickness.

5. The calibration assembly according to claim 1, wherein the reflection plate has a size smaller than the sizes of the plurality of light-permeable plates.

6. The calibration assembly according to claim 1, wherein the plurality of light-permeable plates are made of a non-metallic material.

7. The calibration assembly according to claim 1, wherein the plurality of light-permeable plates are made of plastic, paper, or wood.

8. The calibration assembly according to claim 1, wherein the plurality of first holes are in an elongated shape.

9. The calibration assembly according to claim 8, wherein the reflection plate further has a plurality of second holes, and the plurality of second holes are in a circular shape and have different sizes.

10. The calibration assembly according to claim 1, wherein the predetermined frequency ranges between 0.1 and 10 THz.

11. A calibration assembly for a scan device, comprising:

a light-permeable plate, comprising a plurality of step portions made of a single piece, wherein the light-permeable plate defines a plurality of light-permeable areas that respectively have different thicknesses inversely proportional to transmittances of the plurality of light-permeable areas, and the plurality of light-permeable areas are configured to be permeable to a light having predetermined frequency; and a reflection plate, disposed at a side of the light-permeable plate in a thickness direction of the light-permeable plate, wherein the reflection plate has a plurality of first holes having different sizes, and the reflection plate is configured to block the light having the predetermined frequency.

12. The calibration assembly according to claim 11, wherein the plurality of step portions includes a first step portion, a second step portion, and a third step portion, the second step portion has a size smaller than a size of the first step portion and is connected to the first step portion, the third step portion has a size smaller than the size of the second step portion and is connected to the second step portion, and the reflection plate has a size smaller than the size of the third step portion.

13. A calibration system, comprising:
a conveyor;
a calibration assembly, located on the conveyor, comprising:

a light-permeable plate, comprising a plurality of step portions made of a single piece, wherein the light-permeable plate defines a plurality of light-permeable areas that respectively have different thicknesses inversely proportional to transmittances of the plurality of light-permeable areas, and the plurality of light-permeable areas are configured to be permeable to a light having predetermined frequency; and a reflection plate, disposed at a side of the light-permeable plate in a thickness direction of the light-permeable plate, wherein the reflection plate has a plurality of first holes having different sizes, and the reflection plate is configured to block the light having the predetermined frequency;

at least one light receiver, located at a side of the conveyor; and a light transmitter, located at another side of the conveyor, wherein the light transmitter is configured to transmit the light to the calibration assembly, and the at least one light receiver is configured to receive the light from the calibration assembly.

14. The calibration system according to claim 13, wherein the at least one light receiver comprises a reflection light receiver and a penetration light receiver, the reflection light receiver is located on a reflection path of the light reflected by the reflection plate, and the penetration light receiver is located on a travel path of the light penetrating through the light-permeable plate.

15. The calibration system according to claim 13, further comprising a reflection mirror, wherein the reflection mirror is configured to reflect the light transmitted by the light transmitter to the calibration assembly.

16. A calibration system, comprising:
a conveyor;
a calibration assembly, located on the conveyor, comprising:

a plurality of light-permeable plates, wherein the plurality of light-permeable plates have different sizes, the plurality of light-permeable plates are arranged along thickness directions thereof to form a step shape, the plurality of light-permeable plates define a plurality of light-permeable areas that respectively have different numbers of layers of the light-permeable plates inversely proportional to transmittances of the plurality of light-permeable areas, and the plurality of light-permeable areas are configured to be permeable to a light having a predetermined frequency; and a reflection plate, disposed at a side of one of the plurality of light-permeable plates in the thickness direction thereof, wherein the reflection plate has a plurality of first holes having different sizes, and the reflection plate is configured to block the light having the predetermined frequency;

at least one light receiver, located at a side of the conveyor; and a light transmitter, located at another side of the conveyor, wherein the light transmitter is configured to transmit the light to the calibration assembly, and the at least one light receiver is configured to receive the light from the calibration assembly.

17. The calibration system according to claim 16, wherein the at least one light receiver comprises a reflection light receiver and a penetration light receiver, the reflection light receiver is located on a reflection path of the light reflected by the reflection plate, and the penetration light receiver is located on a travel path of the light penetrating through the plurality of light-permeable plates.

18. The calibration system according to claim 16, further comprising a reflection mirror, wherein the reflection mirror is configured to reflect the light transmitted by the light transmitter to the calibration assembly.

* * * * *